US011562006B2

(12) United States Patent
Young et al.

(10) Patent No.: US 11,562,006 B2
(45) Date of Patent: Jan. 24, 2023

(54) APPARATUS AND METHOD FOR INTERACTIVE ANALYSIS OF AVIATION DATA

(71) Applicant: Ohio State Innovation Foundation, Columbus, OH (US)

(72) Inventors: Seth Young, Upper Arlington, OH (US); Arnab Nandi, Columbus, OH (US); Behrooz Omidvar Tehrani, Saint Martin d'Heres (FR)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 255 days.

(21) Appl. No.: 16/149,363

(22) Filed: Oct. 2, 2018

(65) Prior Publication Data

US 2019/0102407 A1 Apr. 4, 2019

Related U.S. Application Data

(60) Provisional application No. 62/567,380, filed on Oct. 3, 2017.

(51) Int. Cl.
*G06F 16/29* (2019.01)
*G06F 3/04883* (2022.01)
*G06F 3/04815* (2022.01)
*G06F 16/248* (2019.01)

(52) U.S. Cl.
CPC .......... *G06F 16/29* (2019.01); *G06F 3/04815* (2013.01); *G06F 3/04883* (2013.01); *G06F 16/248* (2019.01); *G06F 2203/04808* (2013.01)

(58) Field of Classification Search
CPC ................ H04N 7/157; H04N 1/00432; G06F 2203/04804; G06F 2/0481; G06F 3/017; G06F 3/0488; G06F 3/04883; G06F 2203/04808; G06Q 10/063114
See application file for complete search history.

(56) References Cited

U.S. PATENT DOCUMENTS

2003/0223638 A1* 12/2003 Jackson ............... G06F 16/5838
382/179
2006/0129437 A1* 6/2006 Lee ........................ G06Q 10/02
705/5
2009/0172511 A1* 7/2009 Decherd ............. G06F 16/9537
715/207

(Continued)

OTHER PUBLICATIONS

Sumit Thakur, "20 Advantages of Database Management System", Jul. 19, 2015, pp. 1-10.*

(Continued)

*Primary Examiner* — Jennifer N Welch
*Assistant Examiner* — Amy P Hoang
(74) *Attorney, Agent, or Firm* — Meunier Carlin & Curfman LLC

(57) ABSTRACT

Apparatus and method for receiving, processing and interactively displaying real-time air traffic data representative of the movement of aircraft throughout an airspace. The apparatus is an interactive data visualization framework which provides an immediately visualized aviation-oriented insights, with a focus on evaluating the deviations among flights by route, type, airport, and aircraft performance. The apparatus includes utilities for such as capacity planning, flight route prediction, and fuel consumption analysis.

16 Claims, 18 Drawing Sheets

(56) References Cited

U.S. PATENT DOCUMENTS

| | | | | |
|---|---|---|---|---|
| 2009/0260022 | A1* | 10/2009 | Louch | B60K 35/00 |
| | | | | 719/328 |
| 2010/0060739 | A1* | 3/2010 | Salazar | B64D 11/0015 |
| | | | | 348/148 |
| 2011/0153591 | A1* | 6/2011 | Heller | G06F 16/22 |
| | | | | 707/713 |
| 2013/0055294 | A1* | 2/2013 | Diebner | G06F 9/541 |
| | | | | 719/328 |
| 2013/0304725 | A1* | 11/2013 | Nee | G06F 16/2471 |
| | | | | 707/722 |
| 2014/0032517 | A1* | 1/2014 | Henderson | G06F 16/316 |
| | | | | 707/706 |
| 2015/0358425 | A1* | 12/2015 | Vennelakanti | G01V 1/28 |
| | | | | 709/226 |
| 2016/0232793 | A1* | 8/2016 | Morishita | G08G 5/0026 |
| 2016/0290817 | A1* | 10/2016 | Hoogland | G01C 21/3492 |
| 2016/0358021 | A1* | 12/2016 | Hong | G06T 11/20 |
| 2016/0378861 | A1* | 12/2016 | Eledath | G06K 9/00718 |
| | | | | 707/766 |

OTHER PUBLICATIONS

Behrooz Omidvar-Tehrani, Sihem Amer-Yahia, and Alexandre Termier. Interactive User Group Anallysis. In CIKM, 2015, 11 pages.

Arnab Nandi and HV Jagadish. Guided interaction: Rethinking the query-result paradign. VLDB, 4(12):1466-1469, 2011.

Daniel A Keim. Designing pixel-oriented visualization techniques: Theory and applications. Visualization and Computer Graphics, IEEE Transactions on, 6(1):59-78, 2000.

Lauro Lins, James T Klosowski, and Carlos Scheidegger. Nanocubes for real-time exploration of spatiotemporal datasets. Visualization and Computer Graphics, IEEE Transactions on, 19(12):2456-2465, 2013.

Vivek Kumar and Lance Sherry. Airport troughput capacity limits for demand management planning. In ICNS, pp. 1-10. IEEE, 2009.

\* cited by examiner

APPARATUS AND METHOD FOR INTERACTIVE ANALYSIS OF AVIATION DATA

CROSS-REFERENCE TO RELATED APPLICATION

This application claims priority to U.S. Provisional Patent Application No. 62/567,380, filed Oct. 3, 2017, entitled "Apparatus and Method for Interactive Analysis of Aviation Data," which is incorporated herein by reference in its entirety.

BACKGROUND

Understanding the behavior of flights traveling through an airspace is a highly challenging activity. This is due to the vast volume, types, and missions of aircraft flying through the system and the complexity of the air traffic network through which these aircrafts travel. For example, at any given period of time in the United States, over 5,000 aircraft are flying within the US National Airspace System (NAS), totaling more than 50,000 flights daily and 18 million flights annually.

To date, this vast amount data has been largely untapped for analysis due to the inefficiency of analysis tools. Current approaches attempt to visualize the millions of flight records as a single-shot; however, in practice, aviation analysis is not a single-shot matter, rather it is performed in query-response interactive sessions. In other words, aviation experts want to interact with flight data by implementing various filters and verifying diverse hypotheses.

Traditionally, aviation experts analyze planned flight route and actual flight track data through visualization environments, such as GOOGLE EARTH1 and TABLEAU2. Most often, the application of data is performed in a static environment, with significant effort placed on the input and processing of data in a relevant database and querying interface, for illustration and analysis in a visual format. Such processing may take minutes or hours of analysis per visualization. This creates a limitation on the ability to interactively visualize multiple views, whether it be to compare different flights, or to look at a time series of events. Lack of interactivity limits the analysis power of an aviation expert.

SUMMARY

In accordance with the present disclosure, there is described an apparatus for querying large data sets and visually displaying and interacting with query results. The apparatus includes a data ingestion and storage stack that includes a database, a data cache, the data ingestion and storage stack receiving the large data sets in a predetermined format and storing the large data sets in the database; and a multi-touch screen user interface that presents information in multiple layers to provide a three-dimensional interface to the large data sets. User inputs are received as touch gestures in the multi-touch screen user interface that cause the apparatus to query the database to update the query results displayed in the multi-touch screen user interface in near real-time.

In accordance with another aspect, there is disclosed a method for querying a large data set and visually interacting with query results. The method includes receiving an initial query that is run against a database that stores the large data set; returning query results of the initial query for display in a multi-touch screen user interface; and receiving user inputs as touch gestures in the multi-touch screen user interface that generate at least one subsequent query that is run against the database to update the query results displayed in the multi-touch screen user interface in near real-time.

In accordance with yet another aspect of the disclosure, there is described an apparatus for querying aviation data and visually displaying and interacting with query results. The apparatus includes a data ingestion and storage stack that includes a database, a data cache, the data ingestion and storage stack receiving the aviation data in an Aircraft Situation Display to Industry (ASDI) data format and storing the ASDI data in the database; and a multi-touch screen user interface that presents information in multiple layers to provide a three-dimensional interface to the aviation data. User inputs are received as touch gestures in the multi-touch screen user interface that cause the apparatus to query the database to update the query results displayed in the multi-touch screen user interface in near real-time.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION OF THE DISCLOSURE

Overview

The present disclosure is directed to an aviation data analysis apparatus and methods that provide a fluid interaction between the user and the flight data where the user is provided an interface to observe different sections of data and to test different metrics without delay. The apparatus enables users (e.g., aviation experts) to analyze historical data and make dynamic comparisons that may be time-wise and/or location-wise. In particular, the aviation expert user may have different analytical needs that may be satisfied by querying data within the apparatus and displaying it using visualization methods, such as color-coding, animations, data linking, heat maps and other methods that will be described below.

The analytical needs of the users of the apparatus may vary greatly. For example, a commercial airline may desire to learn more about schedule variability on deviated flights on a daily schedule, whereas corporate flight departments and chartered aircraft may be more concerned with the positioning of aircraft based on a non-scheduled, on-demand flight routing policy. For this aim, the present apparatus supports efficient integration of spatiotemporal UDFs (User-Defined Functions) to satisfy specific needs of experts and provides the capability to create customizable views, summaries, and metrics based on the needs of the expert. UDFs may be performance metrics (on deviation, altitude, speed, volume, etc.) to provide guidance and recommendations towards seeking solutions for optimizing air traffic efficiencies. UDFs may be various combinations of basic statistical measures, such as Average, Minimum, or Maximum speed, altitude, rate of climb, rate of throughput, by specific geographic area, by time of day, by day of week, by aircraft types, by airline, by aircraft tail number, or by airport. Herein, a UDF may be understood as a linear combination of attributes that are translated to a SQL procedure in the background.

Framework

Figure 1:
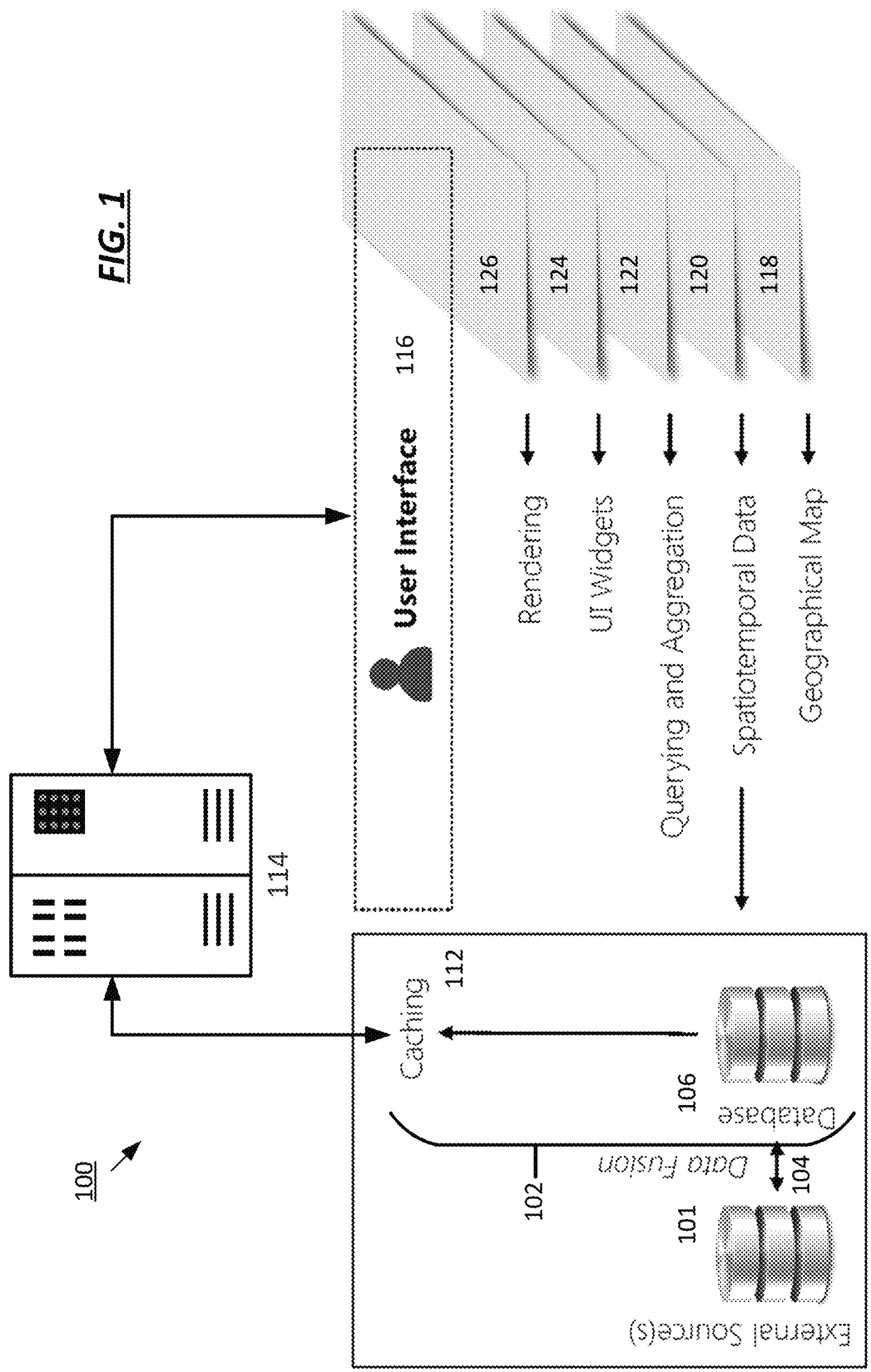
FIG. 1 is a simplified block diagram of an example interactive aviation analysis framework.

With reference to FIG. 1, there is illustrated is an example interactive aviation analysis framework 100 in accordance with the present disclosure. The framework 100 visualizes and interprets results to facilitate a dynamic dialog between the user and the aviation data being analyzed. Query results are returned quickly (e.g., sub-seconds to approximate near-real-time) to provide a fluid interaction with the data.

The framework 100 includes a data ingestion and storage stack 102 that receives aviation flight data 104 from external sources 101. The external sources 101 include, but are not limited to, the Federal Aviation Administration (FAA). The external sources 101 may provide the data in Aircraft Situation Display to Industry (ASDI) data format. A proof-of-concept design of the framework 100 utilized data that included detailed information for 623,906 flights from January 2012 through December 2014, containing 49,652,101 individual ASDI records, each describing a flight's origin, destination, and aircraft type information, as well as minute-by-minute 3D positioning information (latitude, longitude, and altitude). The data ingestion and storage stack 102 includes a database 106 and a data cache 112.

The information retrieved from the data ingestion and storage stack 102 is processed by a computing device 114 that includes a multi-touch screen user interface 116. The multi-touch screen user interface 116 may be divided into layers to provide a three-dimensional interface to the data, where the layers may include, but are not limited to, a geographical map layer 118, spatiotemporal data layer 120, a querying and aggregation layer 122, a user interface widget layer 124 and a rendering layer 126. The multi-touch screen user interface 116 is provided to enable a user to analyze data using touch gestures. For example, the user may initially define a subset of flights for analysis using a query form. This may include, but is not limited to, specifying an airline, a departure or arrival airport and date interval. Later, the user may use touch gestures to refocus the initial query results to refine the analysis. As such, the user may manipulate the data, results and analysis through physical interaction with the multi-touch screen user interface 116. Thus, the user may perform all analysis of the data, including multiple parameters at once, using touch gestures in the multi-touch screen user interface 116. With respect to aviation data, the user may alter several dimensions of the data, including, e.g., latitude, longitude, time, day and altitude all at once.

In operation, when a query request is made to the framework 100, a connection is made to the database 106 to obtain results. The framework 100 uses the data cache 112 to replace a redundant query, which will be made in the future, with a cache-hit. In the case of incremental querying, i.e., if a subset of a requested query already exists in the data cache 112, the framework 100 only queries the missing data and uses responsive data from the data cache 112. For example, for Augusta flights, the framework 100 only queries outgoing flights if incoming flights to Augusta are already in the data cache 112.

Visualization of the flight data in the multi-touch screen user interface 116 may impose limitations. For example, if too many data points are queried (e.g., greater than 500,000), there may be user-perceptible delays, such as lags and slowdowns, specifically in touch gestures. To alleviate this condition, but provide sufficient data for useful visualization, a sampling strategy may be used that returns samples from random segments of the query results where the aggregated count of returned results is below to the visualization limit.

While sampling enables fluid visualization, the query result is scanned entirely in order to pick representative points from different segments. This scanning may be accomplished using shuffling and random sampling, but may be time-consuming. In some implementations, a lazy loading mechanism may be used which exploits spare time on the computing device 114, such as when the user is looking at results, to interactively load additional data. While the user is looking at initial results, the data is "sharpened" by adding more points to the visualization. SQL query-limit operators (limit and offset) may be used for an efficient query slicing and sampling.

In the framework 100, query types are known in advance and offsets may be used. For example, airport names are compared with equality operator and departure/arrival dates are compared with inequality operators. Offsets in lazy loading are only efficient if operated on indexes. As such, the framework 100 may exploit hash and b-tree indexes for query speedup. The count aggregate queries may be precomputed and indexed, which enables cardinality estimation in lazy loading iterations while respecting the visualization limit.

The framework 100 also provides for coordinated views. Brushing and Linking charts (e.g., for aggregated counts on departure/arrival date and time) enable coordinated views, i.e., a brush on any visual component (any chart or the geographical map) will immediately update all other components. Normally this task needs a query execution per brush and per visual component, which is time-consuming. By exploiting the notion of incremental queries, the task evolves to sub-second execution. The combination of indexing, caching, sampling and coordinated help maximize responsiveness of the framework 100.

The framework 100 may be implemented in Python 2.7.10 (or higher) as a computation engine and PostgreSQL 9.3.11 (or higher) as database engine (with proper hash indexes on airport names and b-tree indexes on dates and times). The front-end may be a web-based application in JavaScript. A D3 library may be used for visualizations and LeafletJS may be used for maps. Being a web service, the framework 100 has no requisite and can be executed on any platform.

Figure 2:
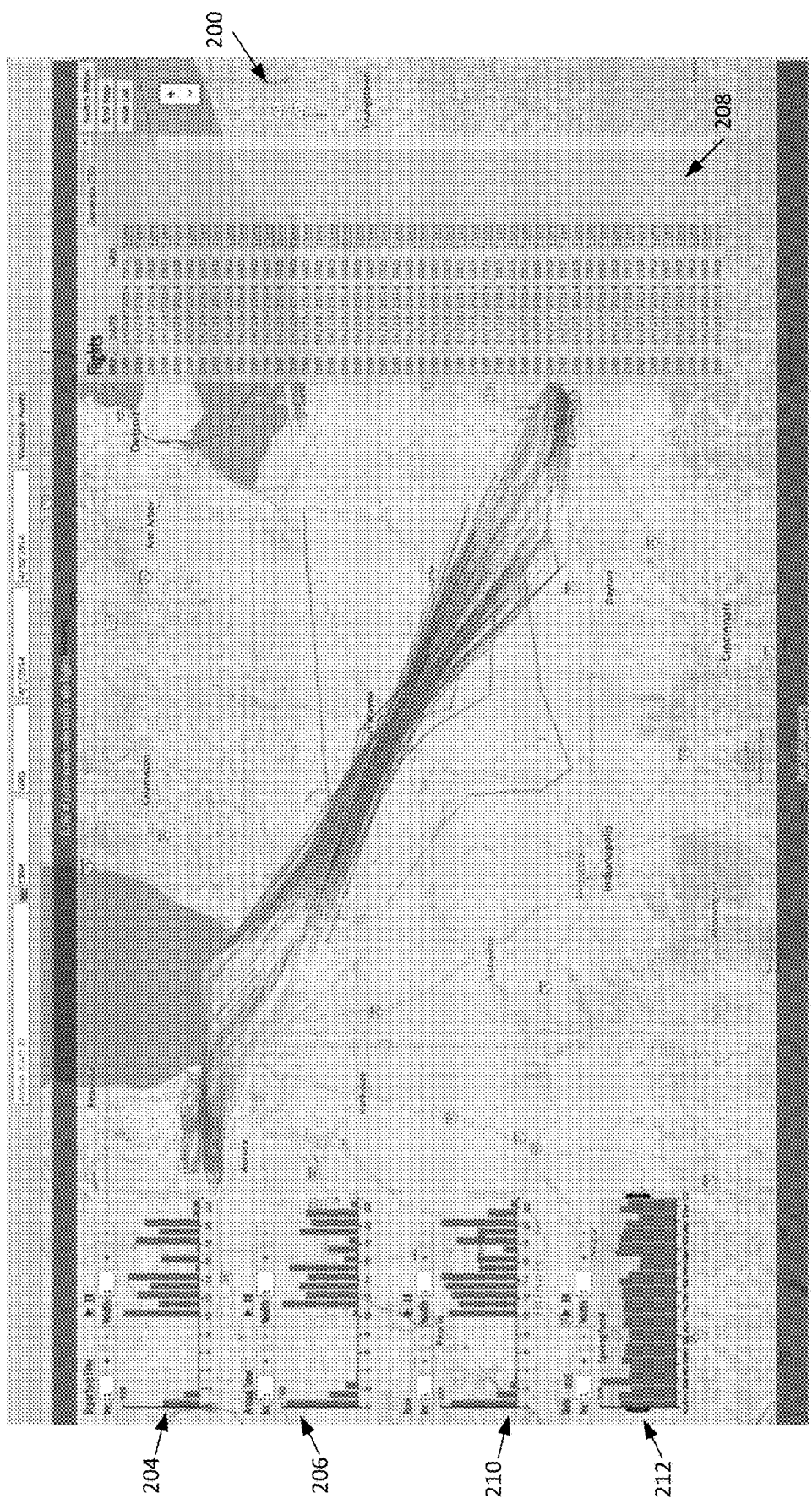
FIG. 2 is an example user interface that displays aviation data and provides for interaction therewith by a user.

FIG. 2 illustrates an example user interface 200 showing a full-screen geographical map and results to a query for flight data. The user interface 200 provides graphical indications (e.g., bar charts) of the number of aircraft departures and arrivals at various time intervals as shown in the departure and arrival controls 204 and 206, respectively. The departure and arrival controls 204 and 206 may be used to adjust the range of departure and/or arrival time(s) to focus the displayed aircraft routes on particular time(s) of interest. A time-based control 208 may be used to adjust the time range of the data on an hourly (or other unit time) basis, while displaying a number of aircraft for each unit of time. A flight table 208 is provided to show, for each visually display flight, a listing of the departing airport (e.g., John Glenn Columbus International Airport (CMH)), the date, and the arrival airport. A link (shown as "view") is also provided for each flight such that the user may select the flight to view additional information. For example, the additional information may include Type of Aircraft, Aircraft Operator (Airline), Flight metrics (Speed, Altitude, Volatility Index), and airport weather at time of arrival or departure. In the user interface 200, time intervals over which flight data is displayed are adjustable by a control 210. The control 2012 may be set to show flight data from different time increments e.g. hours or parts of hours, during a day. The time control 210 also shows a number of results per each unit time in a bar graph format. A date control 212 is provided to adjust a date range of the displayed data, while also displaying a number of results per each displayed date in, e.g., a bar graph format.

As flight information is retrieved it is visually displayed in the user interface 200 using, e.g., color-coding. For example, red and blue may be used to visually display an indication of altitude with respect to a geographic location of each retrieved flight. In the user interface 200, higher altitudes are shown in shades of blue, whereas lower altitudes are shown in shades of red. Other colors and shading may be used to visually display altitude or other attributes to the user, as described below.

By using touch gestures in the user interface 200, the user may zoom into specific geographic areas, zoom in on a specific group of flights, or even a single flight. The user may drive new queries to the database 106 through touch gestures such that the user is directly interacting with the data through physical gestures to drive and update the visualization to achieve a desired analysis result.

Demonstration/Use Cases

Below, three example analysis use cases are presented to demonstrate how the framework 100 can retrieve and present data to achieve a desire analysis. These are provide for example purposes only and should not be considered limiting.

Analysis Scenario 1

In a first example analysis scenario, a business aviation company is interested in understanding the average and maximum speeds flown on various routes with the goal of further understanding flight route efficiencies with respect to total travel time and overall fuel burn. The framework 100 can quickly provide information on traveling speeds by aircraft type, route, and portion of route.

Figure 3:
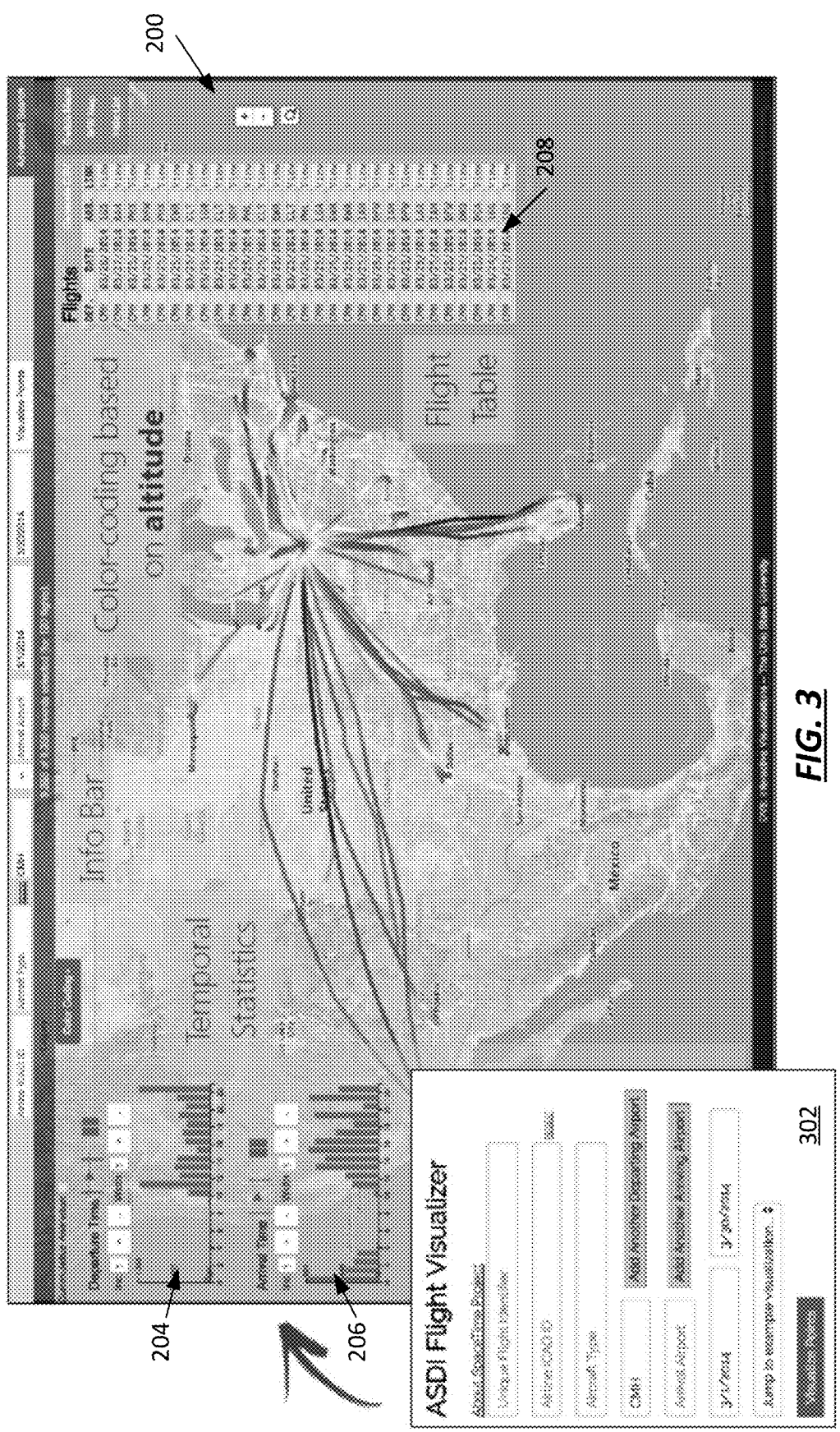
FIGS. 3-8 and 9A-9D illustrate example interactions with the user interface of FIG. 2 in accordance with a first analysis scenario.

FIGS. 3-9 illustrate example user interfaces associated with the first example analysis scenario. With reference to FIG. 3, there is illustrated the user interface 200 in which there is a display of results of a query entered into a flight visualizer dialogue box 302. Here, the user is trying to gain understanding of the differences between the east-bound and west-bound flight routes. The flight visualizer dialogue box 302 includes various fields in which a user may identify information to query from the database 106 such as, but not limited to, a unique flight number, and airline ID, aircraft type, a departing airport, arriving airport, and a date range in which to query information. As flight information is retrieved it is visually displayed in the user interface 200 using color-coding to visually display an indication of altitude with respect to a geographic location of each retrieved flight, as noted above.

The flight data shown in the user interface 200 shows flights departing from John Glenn Columbus International Airport (CMH). As can be understood from the color-coded data, departing flights have a relatively lower altitude as they depart Columbus International Airport (as shown in red), gain altitude (as shown in blue), and then descend to land at various airports throughout the United States (as shown in red).

Figure 4:
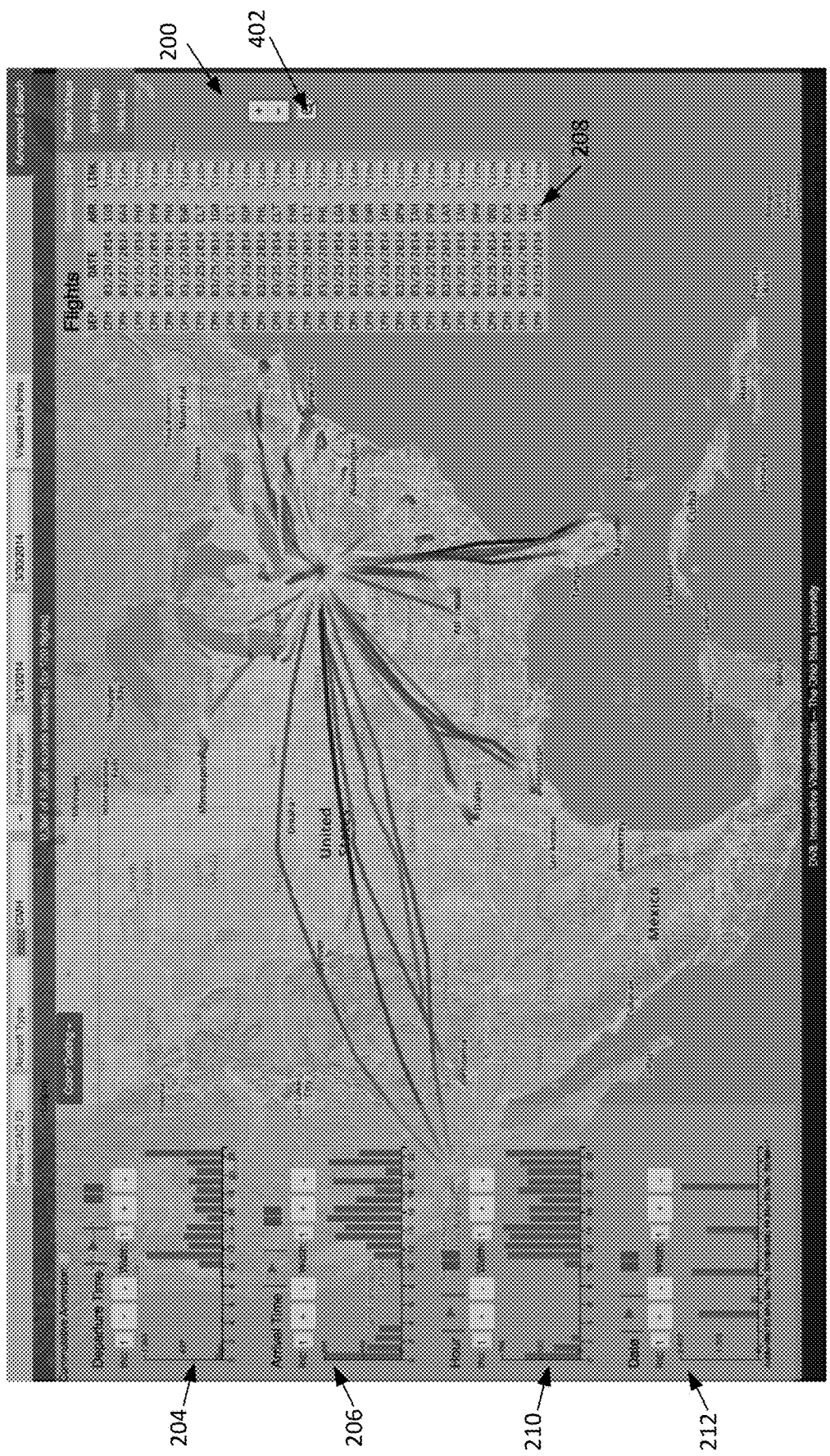
Figure 5:
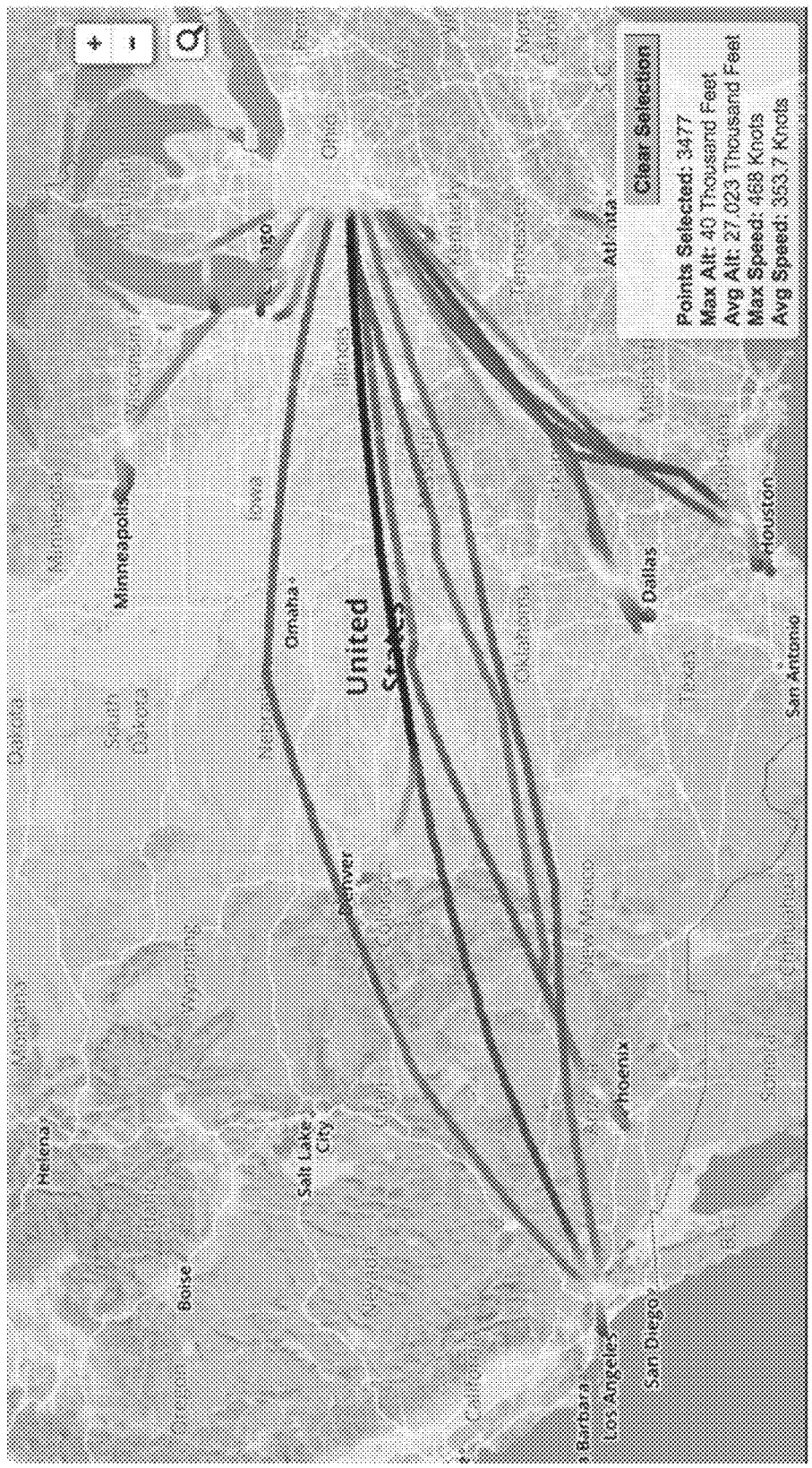
Figure 6:
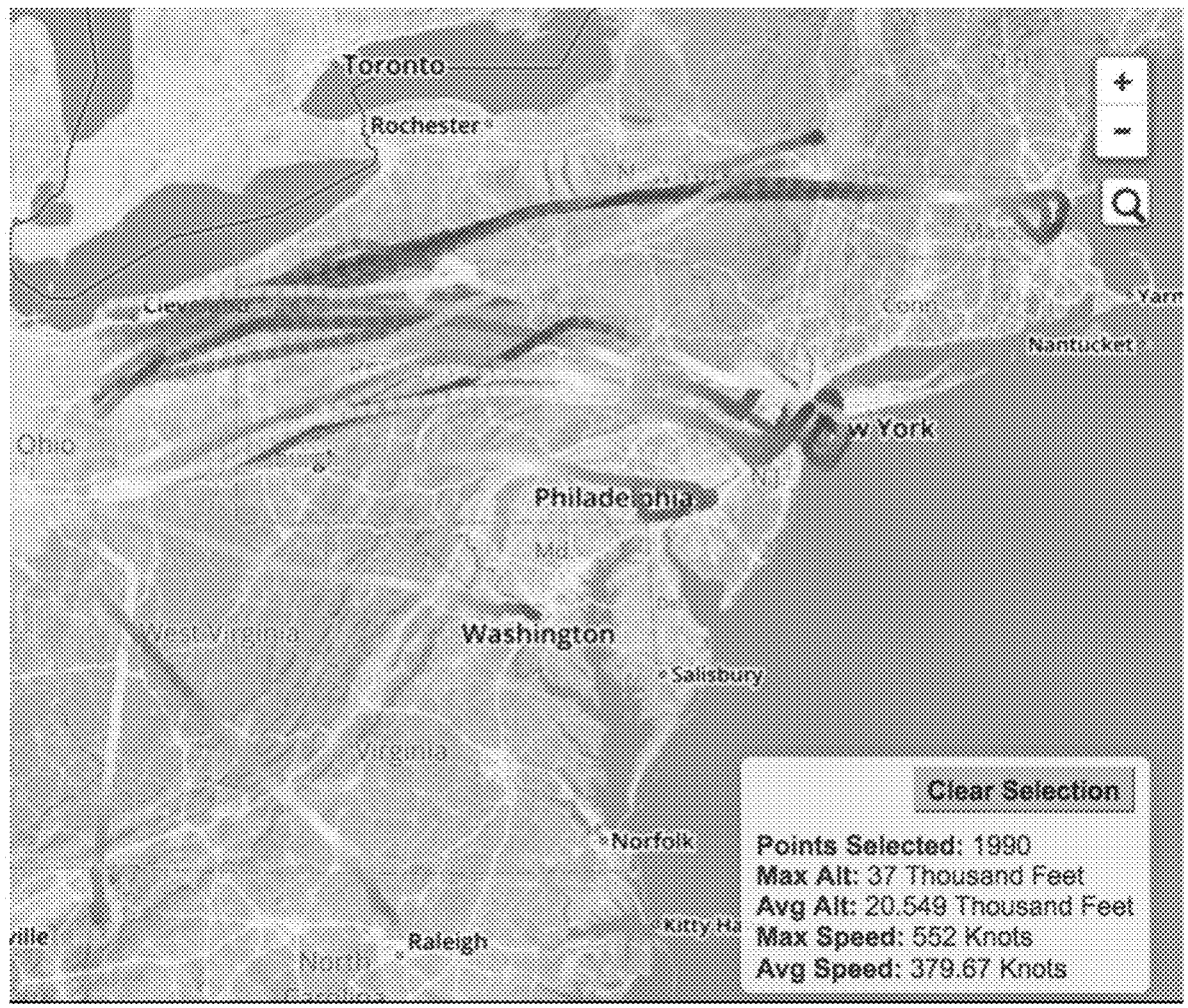
Figure 7:
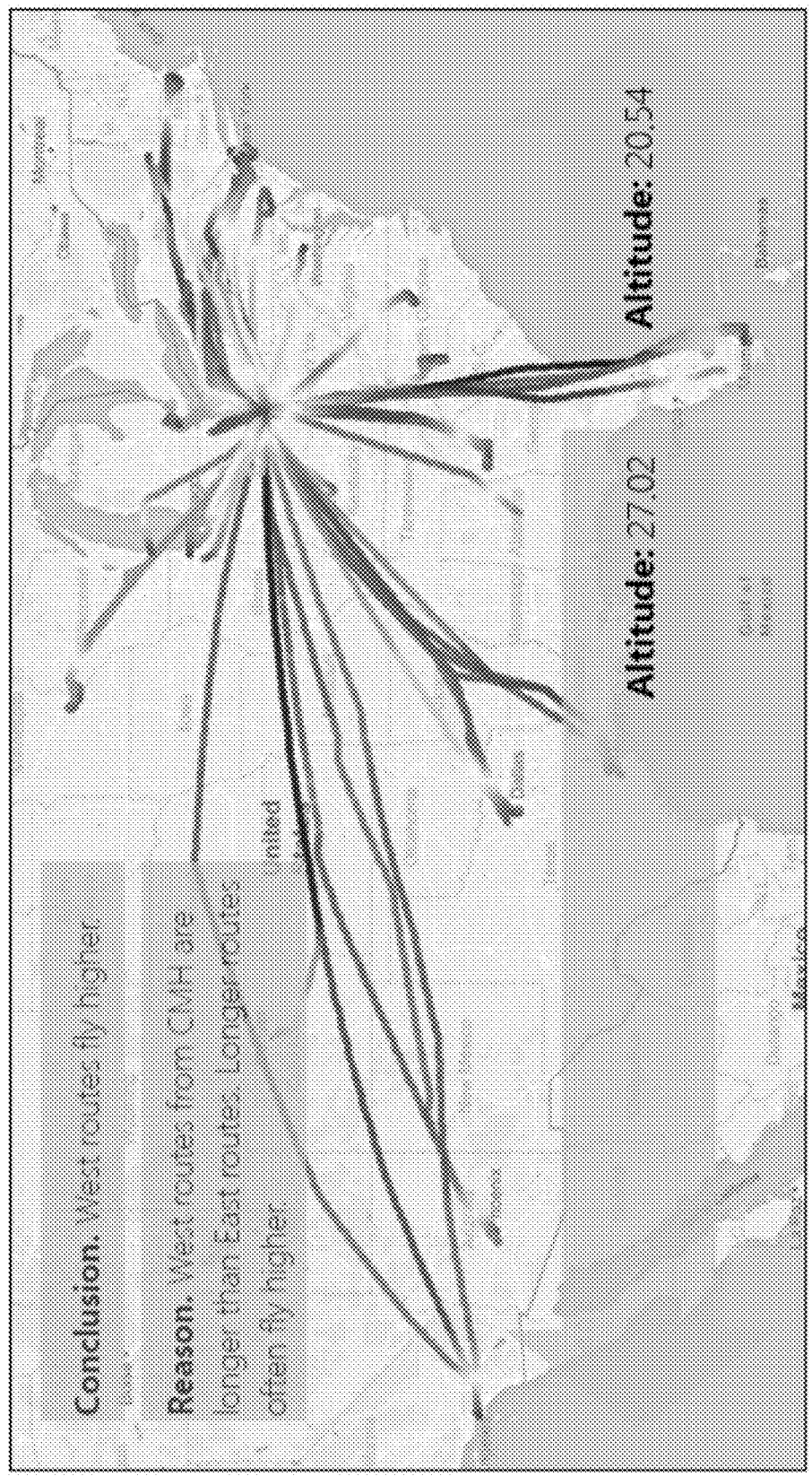
Figure 8:
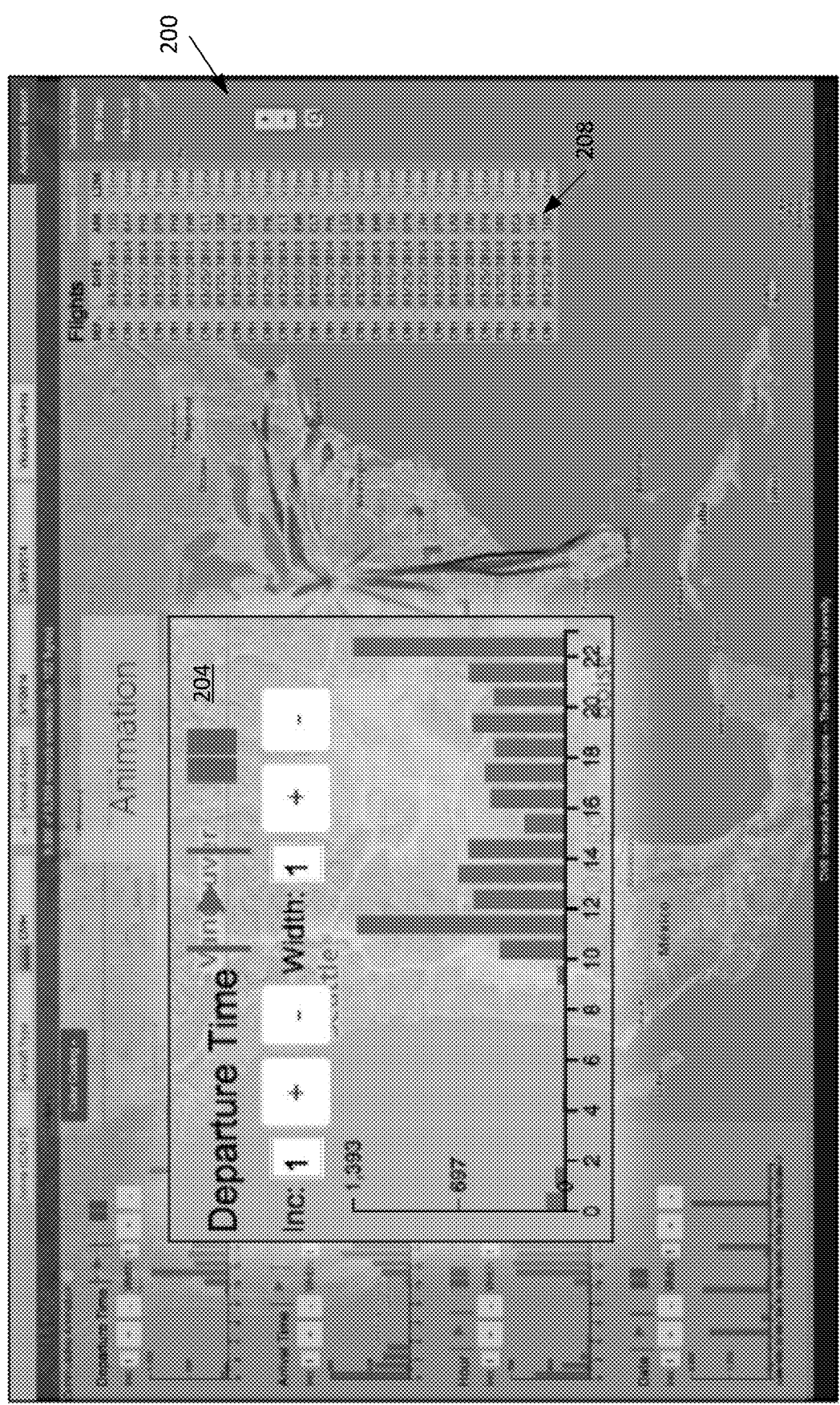

FIG. 4 illustrates a selection operator 402 in the user interface 200. Using the selection operator 402, the user may select particular flight routes of interest. As shown in FIG. 5, user has selected only the west-bound flight routes departing from CMH. FIG. 6 shows a selection of the east-bound flight routes departing from CMH. FIG. 7 shows a comparison of the east-bound flight routes versus the west-bound flight routes. As shown from the data, the wet-bound flight routes are flown at generally higher altitudes as compared to the east-bound flight routes.

Figure 9B:
Figure 9D:
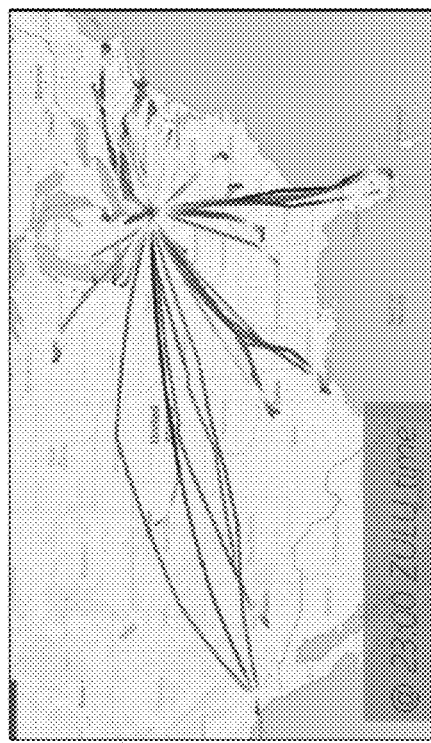
Figure 9A:
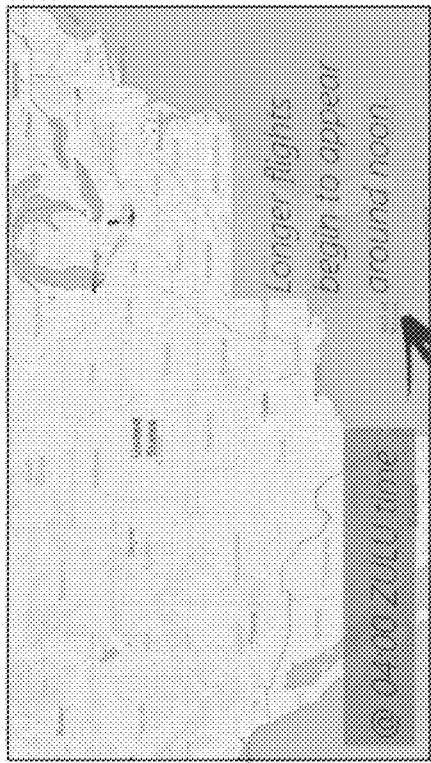
Figure 9C:
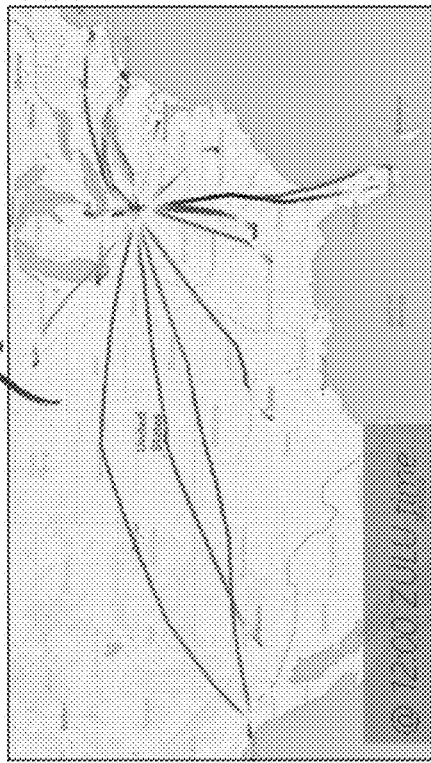

FIGS. 8 and 9A-9D illustrate that the departure time control 204 may be used to create an animation that visualizes the evolution of departing flight routes over the course of the day. For example, the snapshots of FIGS. 9A-9D show how flight patterns evolve from 0 to 2300 hrs. Zulu Time. As can be seen, there are no flight departures early in the day (FIG. 9A). In the morning, East Coast flights begin to depart (FIG. 9B). Later, the longer West Coast flights begin to appear around 1200 hrs. (FIG. 9C). The full evolution of flights throughout the entirety of the day is shown in the final snap-shot of FIG. 9D.

Thus, the framework 100 can be used to provide an understanding of the speed and altitude that aircraft attain on various routes, and provide a visualization of flight departures from an airport over time.

Analysis Scenario 2

In the second example scenario, the framework 100 may be used by an airline to perform an analysis of how its flights are being routed as compared to another competing airline flying the same route. An airline may also want to get a better idea of the flow of traffic at various altitudes on routes of interest (e.g., color coding flights based on their average altitude and observe the abundance of flights in various altitudes).

Figure 10:
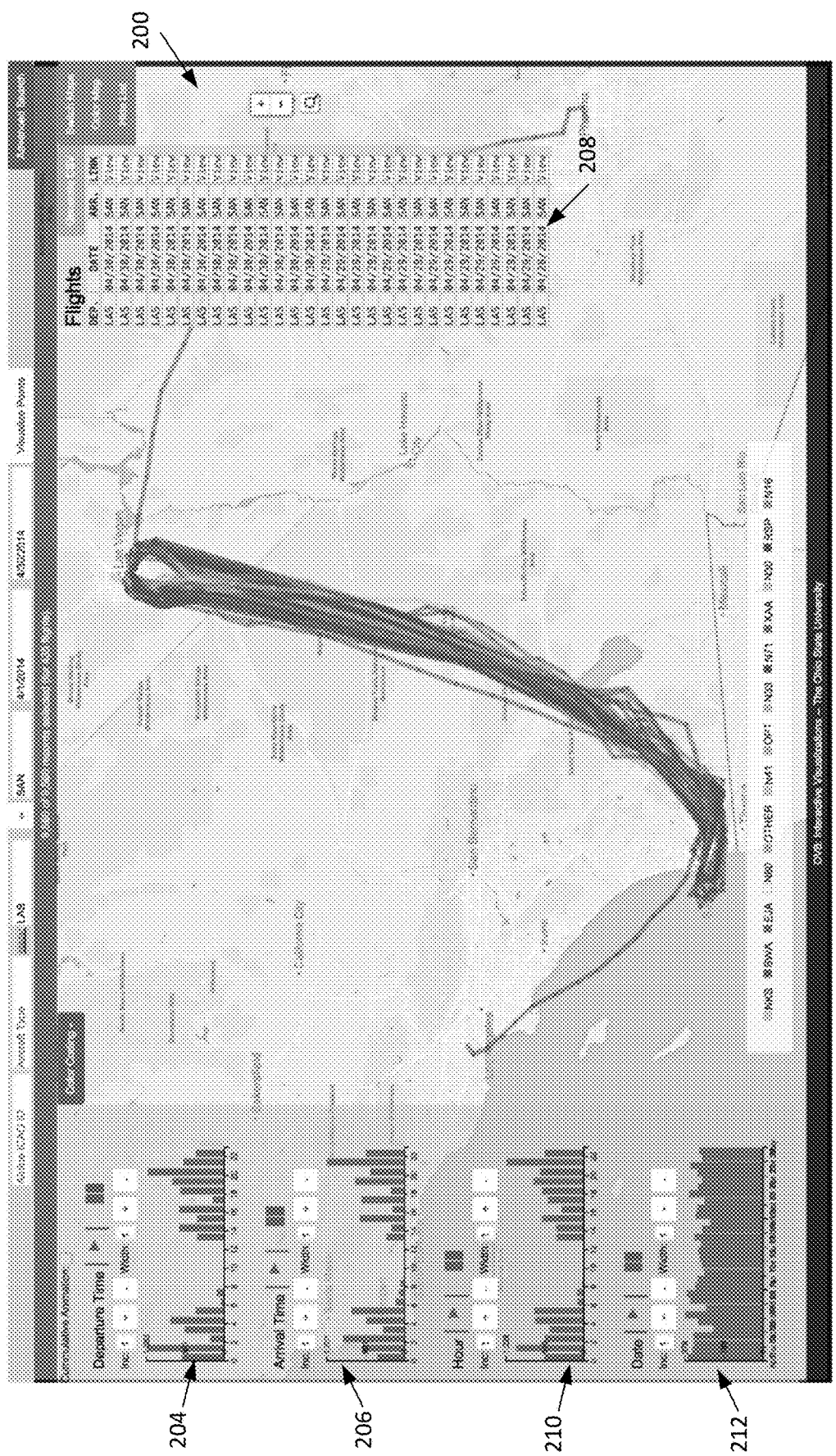
FIGS. 10, 11A-11B and 12A-12B illustrate example interactions with the user interface of FIG. 2 in accordance with a second analysis scenario.

In accordance with the second example analysis scenario, FIGS. 10-12 show various user interface visualizations as the user interacts with the framework 100 to visualize route efficiency. In particular, FIG. 10 illustrates that the user interface 200 may be used by a user to understand route efficiencies by comparing routes between various airlines. In the interface 200, each airline is color-coded to have its own unique color. For example, it can be seen that Southwest Airlines (shown in blue) operates a majority of the flight routes between Las Vegas and San Diego. Also, there is abnormal behavior of a JetSuite flight (in red) that landed in Los Angeles, rather than San Diego.

Figure 11B:
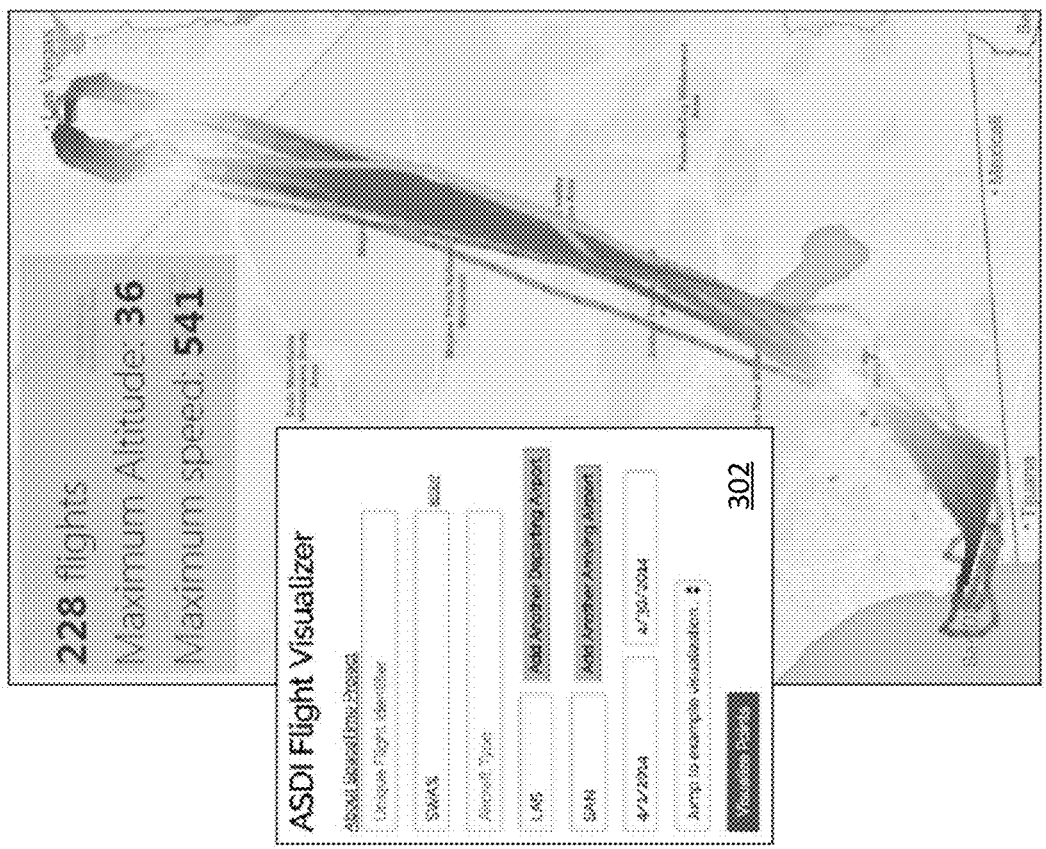
Figure 11A:
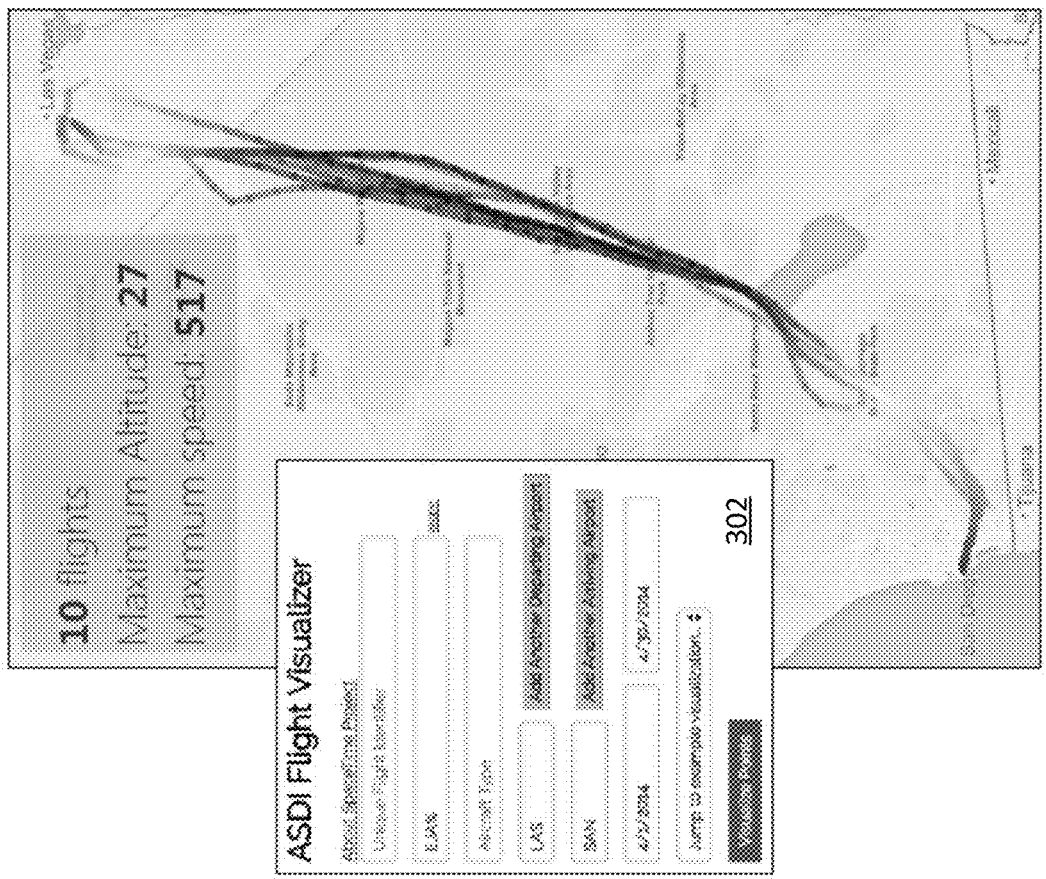

FIGS. 11A and 11B illustrate a comparison of NetJet flights traveling between Las Vegas and San Diego (FIG. 11A) with those of Southwest Airlines (FIG. 11B). From the visualizations, a user can ascertain that the NetJet flights generally flew at a lower altitude then Southwest flights and also flew a slower speed than the Southwest flights.

Figure 12B:
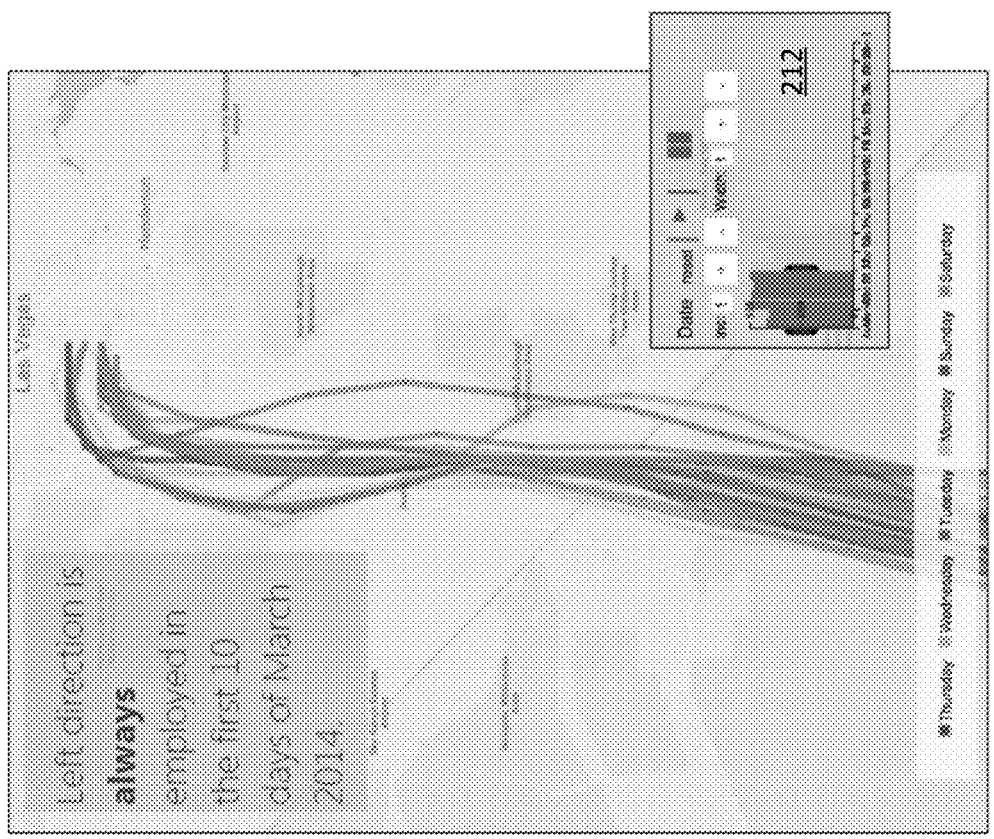
Figure 12A:
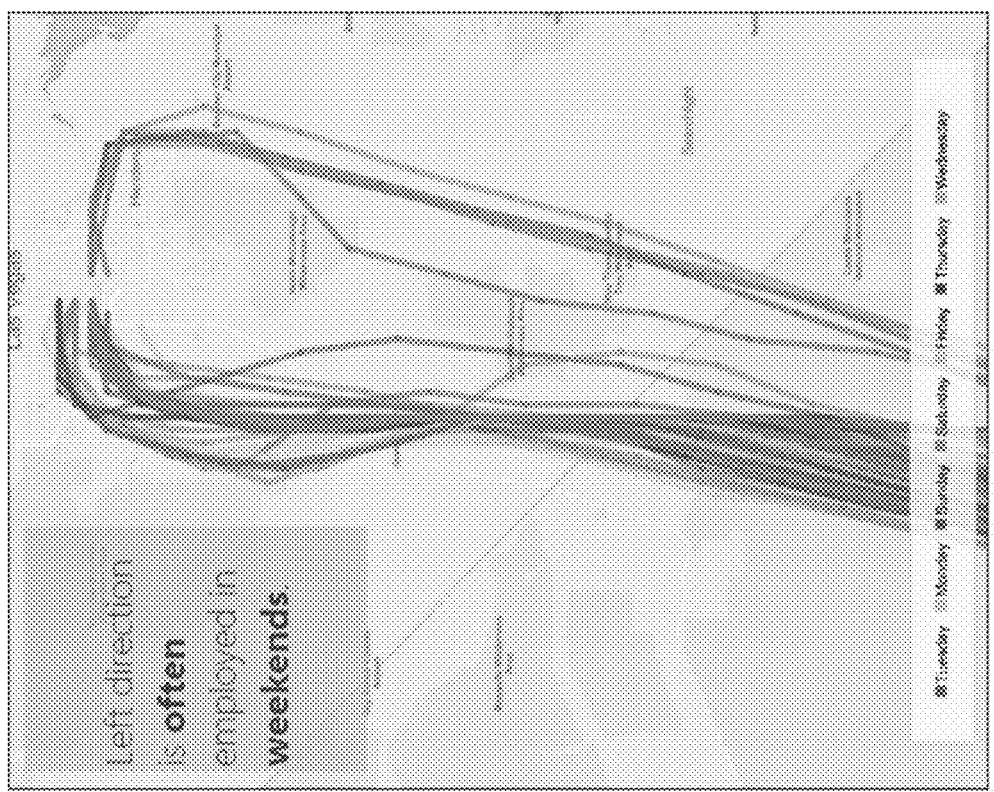

FIGS. 12A and 12B illustrate load management scenarios for flights between Las Vegas and San Diego for each day of the week. As shown in FIG. 12A, the left direction is often use on weekends. By using the date selector 212, user may evaluate flights for certain date range. For example as shown in FIG. 12B, the left direction was always used in the first 10 days of March 2014.

Thus, the framework 100 may be used to perform an analysis of competitor's routes, and to gain an understanding of the flow of air traffic at various altitudes on routes of interest.

Analysis Scenario 3

In the third example analysis scenario, the framework 100 enables a user to analyze traffic flow efficiencies at airports. For this, the user may define a metric that measures the volatility of flight routes flown by aircraft to and from a given airport. Hence, a deviation metric is constructed as a UDF which is the standard deviation of Haversine distances between actual flight track and planned route. For instance, the UDF returns 0.35 for a flight from New York to Augusta in Apr. 12, 2014, and returns 0.20.

3 for the same flight in April 13. Hence the latter flight is less deviated. Deviation aggregations enable identifying optimal routes which contributes to fuel consumption optimization.

Figure 13:
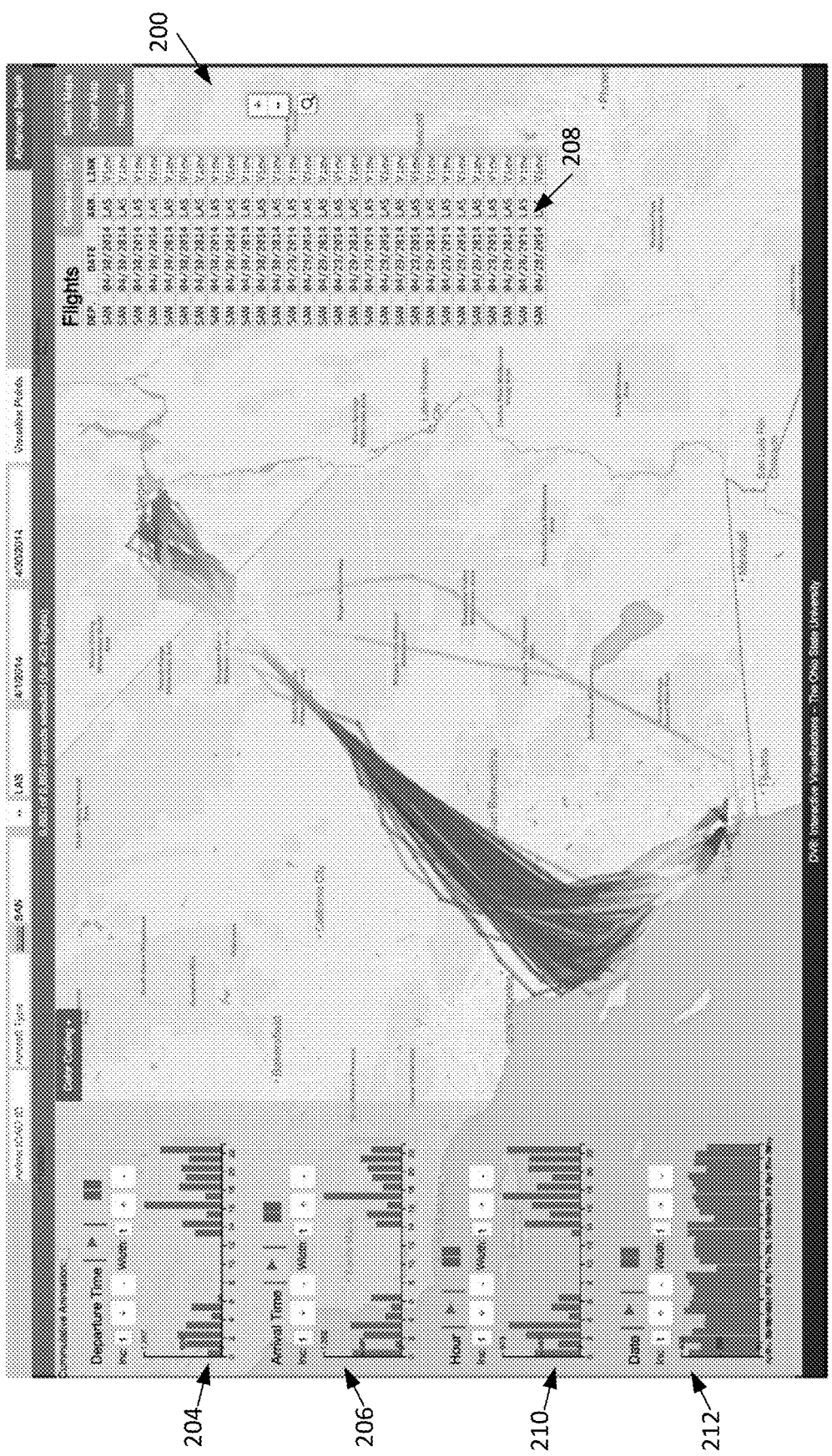
FIGS. 13-14, 15A-15B and 16A-16B illustrate user interfaces and a determination of a Volatility Index.

FIGS. 13-16 illustrate example user interfaces associated with the third example analysis scenario and a determination of a Volatility Index. FIG. 13 illustrates that the user interface 200 may be used by the user to analyze flight deviations with a goal to understand flight efficiency in order to optimize fuel burn between destinations. In FIG. 13, the user interface 200 is displaying flights between San Diego and Las Vegas in April 2014.

Figure 14:
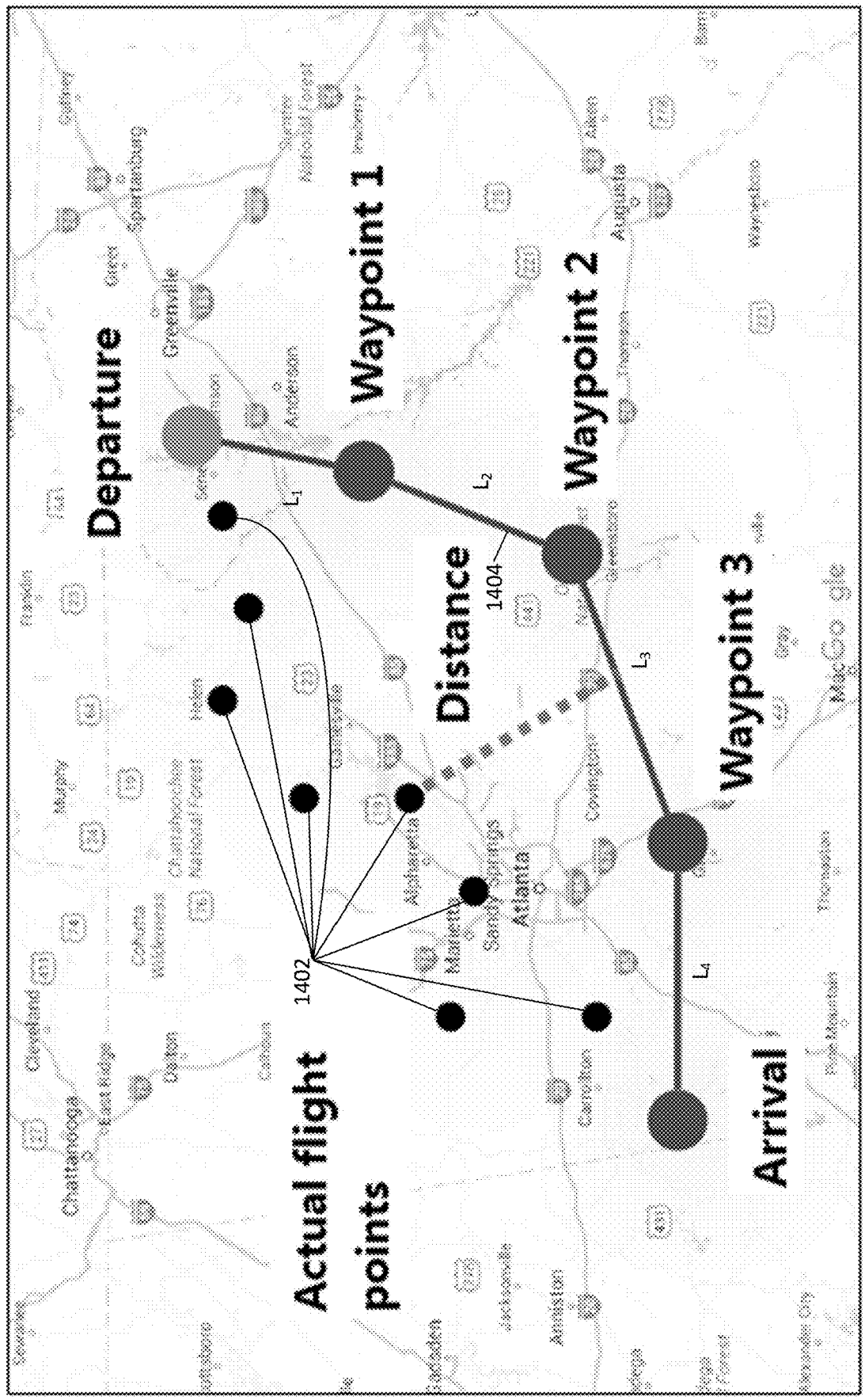

FIG. 14 illustrates an example of determining a Volatility Index. In particular, if a flight has less deviation, it burns less fuel and it arrives earlier, which increases energy optimization and passenger satisfaction. Thus, it is useful to detect fuel burn and the delays caused by any deviation. In FIG. 14, distances from the dots 1402 to the flight path 1404 are aggregated to calculate Volatility Index for the flight. The Volatility Index may be relatively large due to both the overall distance from the actual flight path and the changes in distance from the path over the flight. This correlates to a higher than expected fuel burn for the flight. In general, the higher the volatility index, the greater the fuel burn is over expected levels. In summary, for each flight track record (latitude, longitude, altitude, at a particular time), the framework 100 compares the location of the aircraft to the flight's planned path (or great circle distance as an option), by estimating the distance between the point and the associated path using trigonometric calculations appropriate 3D spherical geometries. The aggregation of these distance values among all points on flight route is defined as the route Volatility index. Thus, the Volatility Index is a measure that captures the notion of deviation for a given flight. The measure is useful to detect fuel burn and delay caused by the deviation.

To introduce the concepts behind the Volatility Index, in a two dimensional space, given a point $p=(x, y)$ and a line L whose start-point is $L_s=(x_s, y_s)$ and end-point is $L_e=(x_e, y_e)$. The distance between p and L is defined as follows:

$$dist(p, L) = \frac{|(x_e - x_s) \cdot (y_s - y) - (x_s - x) \cdot (y_e - y_s)|}{\sqrt{(x_e - x_s)^2 + (y_e - y_s)^2}} \quad (1)$$

Given a pair of airports $a_s$ and $a_e$, a straight line L can be defined where $L_s=a_s$ and $L_e=a_e$. As a convention, the x coordinate is used herein to represent longitude and y coordinate is used herein to represent latitude. Equation (1) above may be used to compute the distance between any given geographical point and L. For example, coordinates of four different airports are shown in Table 1, below. Consider a straight line L between CMH and AGS airports. Based on Equation (1), the distance L between CMH and TEB airport is 8.6278. Also, the distance L TEB and LAX airport is 34.3346.

TABLE 1

Airport Coordinates

| Airp | Name | Longitude | Latitude |
|------|------|-----------|----------|
| AGS | Augusta Regional Airport | −81.9645 | 33.369944 |
| CMH | Port Columbus | −82.891889 | 39.997972 |
| TEB | Teterboro Airport | −74.060837 | 40.850103 |
| LAX | Los Angeles International | −118.408075 | 33.942536 |

However, in reality, flights do not follow a straight line between the departure airport and the arrival airport. As shown in FIG. 14, an actual flight plan between a pair of airports consists of waypoints which the pilot should meet. Waypoints are defined with a name and their coordinates. Thus, to account for a flight plan, the distance computation is modified to consider a polyline P instead of a single line. The polyline P consists of n+1 lines $\{L_1, L_2 \ldots L_{n+1}\}$ where n is the number of waypoints in the flight plan. $L_1$ is the line between the departure airport and the first waypoint, $L_2$ between the first and second waypoints, $L_{n+1}$ between the n-th waypoint and the arrival airport. The distance between a point p and P is computed as follows:

$$dist(p,P) = \min_{L_i \in P}(dist(p, L_i)) \quad (2)$$

In accordance with the present disclosure, whenever the flight plan is not available for a flight, Equation (1) may be used, otherwise Equation (2) may be used.

Volatility Index (VOLX)

For a flight f whose departure $f_{dept}$ is the airport as and arrival $f_{arr}$ is the airport ae. P is the polyline between $f_{dept}$ and $f_{arr}$. The set $f_{pt}$ contains all GPS records f. The following Equation defines Volatility Index denoted as VOLX.

$$VOLX(f) = aggr_{P \in f_{pt}}(dist(p,P)) \quad (3)$$

The aggr( ) can be any aggregation function like average, sum, min, standard deviation, etc. Herein, average may be used as an aggregation function, however the present disclosure is not limited to using average as the aggregation function.

Considering Altitude

Consider that an airplane that has an average higher altitude should have a smaller Volatility Index. A coefficient for VOLX in Equation (3) may be used to make it altitude-aware, as shown below:

$$VOLAX(f) = VOLX(f) \times \frac{avg_{p \in f_{pt}}(p.alt)}{999}, \quad (4)$$

where p.alt is the altitude of the point p. The altitude coefficient may be normalized between 0 and 1, as the average altitude is divided by 999, i.e., the highest possible altitude.

Figure 15B:
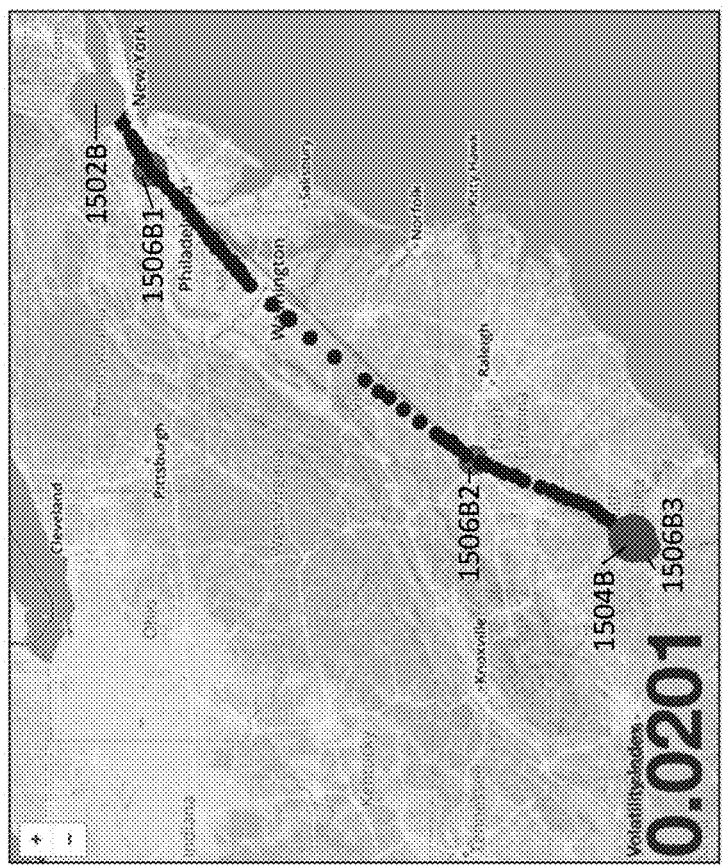
Figure 15A:
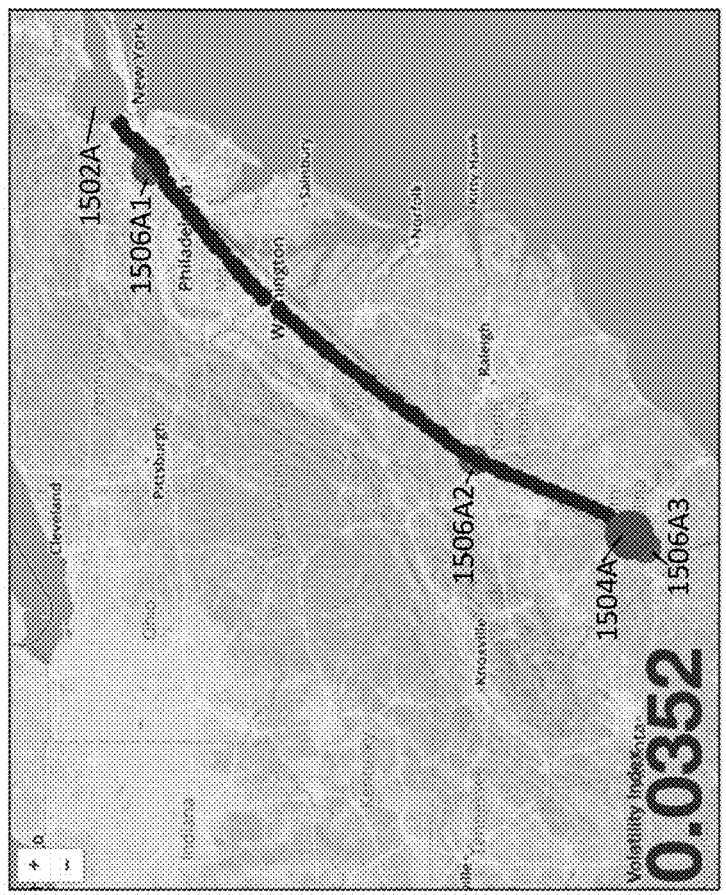

As an example of the above, with reference to FIGS. 15A-15B, there is shown two flights between HPN (Westchester County) and AGS airports. The first flight on a first day is shown in FIG. 15A, and the second flight, on a second day is shown in FIG. 15B. The departure airport is show as 1502A and 1502B, respectively, and the arrival airport is shown as 1504A and 1504B, respectively. The waypoints are shown as 1506A1, 1506A2 and 1506A3 and 1506B1, 1506B2 and 1506B3. The first waypoint is called BIGGY and the second one is GSO. Both flights are very close to the polyline (hence a small VOLAX value), but the flight shown in FIG. 15A has some deviations at the first waypoint. As such, it has a larger Volatility Index.

Distance Comparison

To complement the Volatility Index, different types of distance may be compared to provide additional analysis. These include, but are not limited to:
1. Actual Distance. The distance that an airplane actually traverses.
2. As-the-Crow-Flies Distance (ACF). The length of the straight line between departure and arrival airports.
3. Route Distance. The length of the polyline induced by waypoints in the flight plan.

TABLE 2

Distances (in miles)

| Flight | Date | Actual | ACF | Route |
|---|---|---|---|---|
| HPN-AGS | Apr. 12, 2014 | 659 | 651 | 688 |
| HPN-AGS | Apr. 13, 2014 | 652 | 651 | 688 |
| LAX-AGS | Apr. 4, 2013 | 2124 | 2088 | — |
| LAX-AGS | Mar. 1, 2012 | 2171 | 2088 | — |
| DEN-TEB | Jun. 7, 2013 | 1620 | 1600 | — |
| DEN-TEB | Apr. 6, 2014 | 1616 | 1600 | — |

The distance calculation may be based on transforming spherical coordinates to rectangular coordinates. Spherical coordinates define the space for longitude and latitude. Once, a transform is made to rectangular coordinates, traditional distance formulas may be used. The distance between a given pair of geographical points s and e is defined as follows:

$$\text{dist}(s,e) = [a \cos(\cos(s_{lat}) \cdot \cos(e_{lat}) \cdot \cos(s_{lng}) \cdot \cos(e_{lng}) + \cos(s_{lat}) \cdot \sin(e_{lat}) \cdot \cos(s_{lng}) \cdot \sin(e_{lng}) + \sin(s_{lat}) \cdot \sin(e_{lat}))] \times r \quad (5)$$

wherein the lat and lng subscripts show the latitude and longitude components of points, respectively. Also, r is the earth radius, i.e., 3963.1 miles. Table 2 illustrates these distances for flights in FIGS. 15A-15B, as well as other instances.

Figure 16A:
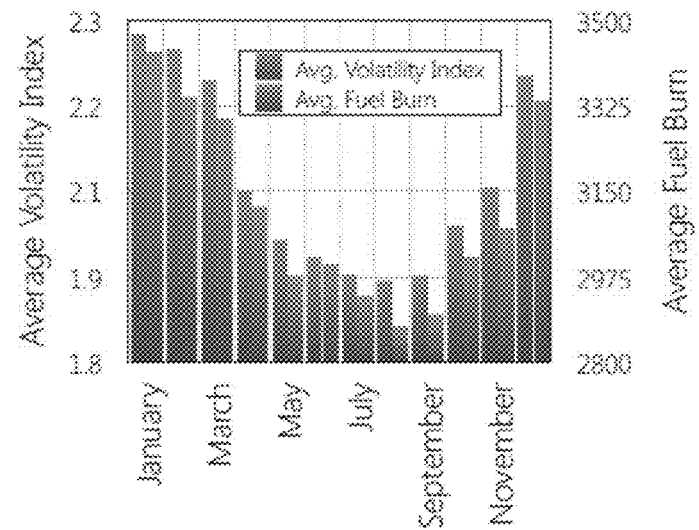
Figure 16B:
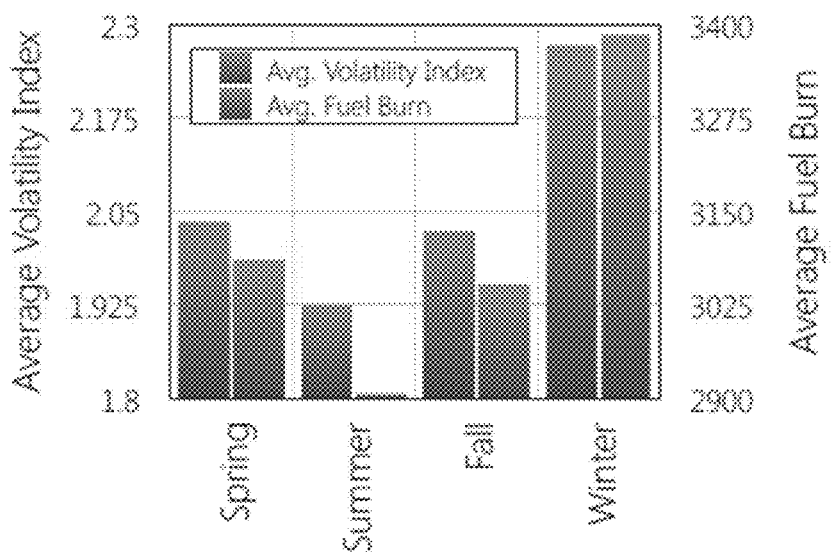

From Table 2, it can be observed that the deviation around waypoint 1506A1 in the HPN-AGS flight shown in FIG. 15A required 7 extra miles. Also, a 47 mile optimization is observed for LAX-AGS itinerary comparing a 2012 and 2013 flight. This distance difference increases the Volatility Index, which can be translated to fuel burn, fuel cost or delay. For instance, by considering an average situation for an approximation, the LAX-AGS flight in 2013 has 210 dollars less fuel cost and it ends approximately 6 minutes earlier. FIGS. 16A and 16B shown additional examples of how the deviation distances can be correlated to the Volatility Index that is indicative of fuel burn.

Figure 17:
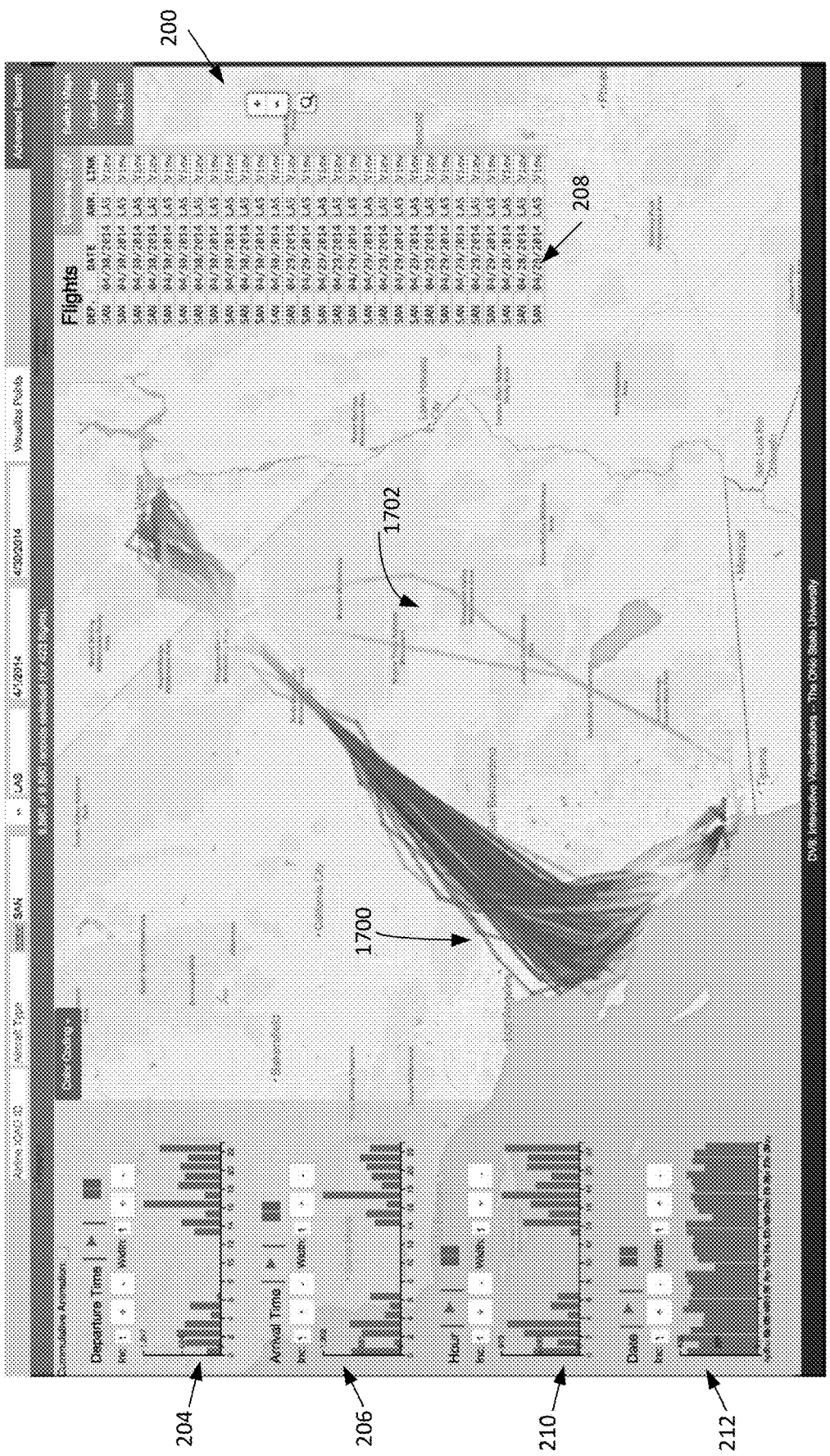
FIGS. 17 and 18A-18B illustrate example interactions with the user interface of FIG. 2 in accordance with a third analysis scenario.
Figure 18A:
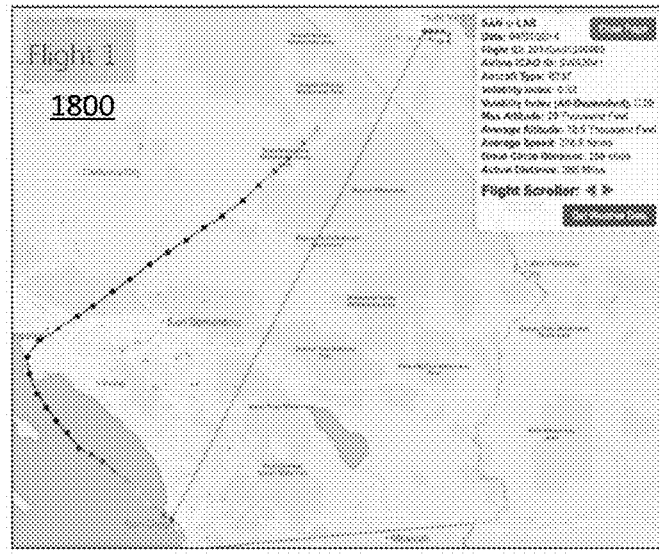
Figure 18B:
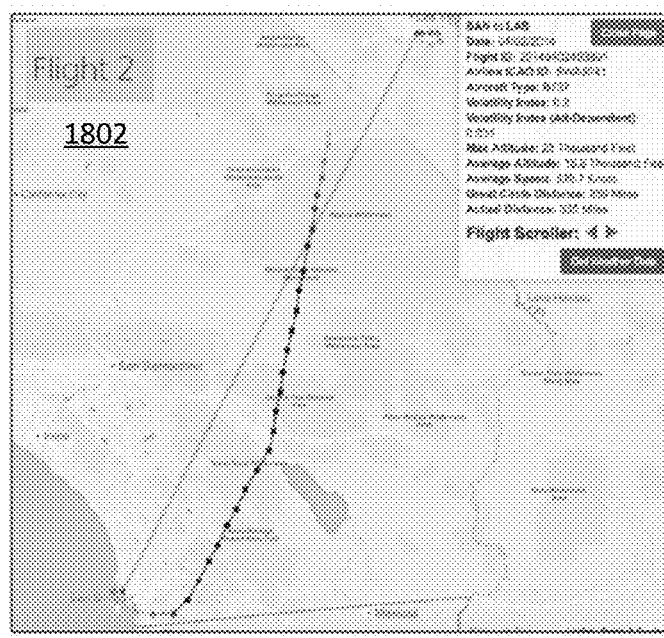

In yet other examples of information and analysis that can be presented by the framework 100, FIG. 17 is an example deviation comparison of the first flight 1700 with a second flight 1702. As shown in FIGS. 18A and 18B, the first flight 1800 flew a Great Circle distance of 258 miles and an actual distance of 385 miles. This resulted in a volatility index of 0.32. In comparison, the second flight 1802 flew a Great Circle distance of 259 miles and an actual distance of 335 miles. This resulted in a lower volatility index of 0.20. Thus, the framework 100 may be used to determine a volatility index metric that is a measure of how much a flight has deviate from a planned route.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and nonvolatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An apparatus for querying four-dimensional geospatial air traffic data that is associated with a plurality of flight routes and visually displaying and interacting with query results retrieved from the four-dimensional geospatial air traffic data, comprising:
   a data ingestion and storage stack that includes a database and a data cache, the data ingestion and storage stack receiving the four-dimensional geospatial air traffic data in a predetermined format and storing the four-dimensional geospatial air traffic data in the database; and
   a multi-touch screen user interface that presents flight route information in multiple layers to provide a three-dimensional interface to the four-dimensional geospatial air traffic data, the flight route information including the query results from the database,
   wherein, in response to user inputs received by the apparatus, a subset of the four-dimensional geospatial air traffic data is presented in the multi-touch screen user interface as initial query results,
   wherein subsequent user inputs are received as touch gestures in the multi-touch screen user interface to refocus the query results by causing the apparatus to query the database to update the initial query results displayed in the multi-touch screen user interface in near real-time, and
   wherein the multiple layers of the multi-touch screen user interface include a geographical map layer, spatiotemporal data layer, a querying and aggregation layer, a user interface widget layer and a rendering layer.

2. The apparatus of claim 1, wherein a sampling strategy is used to return samples from random segments of the query results for display in the multi-touch screen user interface.

3. The apparatus of claim 2, wherein the query results are scanned in order to select representative points from different ones of the random segments.

4. The apparatus of claim 2, wherein a lazy loading mechanism is used to load additional query results in the multi-touch screen user interface while the apparatus is idle.

5. The apparatus of claim 1, wherein, the query results are visualizations of a subset of the plurality of flight rights that are displayed in the multi-touch screen user interface.

6. The apparatus of claim 5, wherein touch gestures alter at least one of a latitude, a longitude, a time, a day and an altitude of the subset of the plurality of flight routes that is displayed in the multi-touch screen user interface.

7. A method for querying four-dimensional geospatial air traffic data that is associated with a plurality of flight routes and visually interacting with query results retrieved from the four-dimensional geospatial air traffic data, comprising:
receiving an initial query that is run against a database that stores the four-dimensional geospatial air traffic data;
returning query results of flight route information from the initial query to present display of initial query results in a multi-touch screen user interface;
receiving subsequent user inputs as touch gestures in the multi-touch screen user interface to refocus the query results and to generate at least one subsequent query that is run against the database to update and display the query results in the multi-touch screen user interface in near real-time; and
presenting the results in a plurality of layers in the multi-touch screen user interface to provide a three-dimensional interface to the four-dimensional geospatial air traffic data,
wherein the multiple layers of the multi-touch screen user interface include a geographical map layer, spatiotemporal data layer, a querying and aggregation layer, a user interface widget layer and a rendering layer.

8. The method of claim 7, further comprising using a sampling strategy to return samples from random segments of the query results for display in the multi-touch screen user interface.

9. The method of claim 8, further comprising scanning the query results to select representative points from different ones of the random segments.

10. The method of claim 8, further comprising using a lazy loading mechanism to load additional query results in the multi-touch screen user interface during periods of idle time.

11. The method of claim 7, wherein, the query results are visualizations of a subset of the plurality of flight rights that are displayed in the multi-touch screen user interface.

12. The method of claim 11, wherein touch gestures alter at least one of a latitude, a longitude, a time, a day and an altitude of the subset of the plurality of flight routes that is displayed in the multi-touch screen user interface.

13. An apparatus for querying four-dimensional geospatial air traffic data that is associated with a plurality of flight routes and visually displaying and interacting with query results retrieved from the four-dimensional geospatial air traffic data, comprising:
a data ingestion and storage stack that includes a database and a data cache, the data ingestion and storage stack receiving the four-dimensional geospatial air traffic data in an Aircraft Situation Display to Industry (ASDI) data format and storing the ASDI data in the database; and
a multi-touch screen user interface that presents flight route information in multiple layers to provide a three-dimensional interface to the four-dimensional geospatial air traffic data, the flight route information including the query results,
wherein, in response to user inputs received by the apparatus, a subset of the four-dimensional geospatial air traffic data is presented in the multi-touch screen user interface as initial query results,
wherein subsequent user inputs are received as touch gestures in the multi-touch screen user interface to refocus the query results through a physical interaction of the user and the multi-touch user interface the causes the apparatus to query the database to update the initial query results displayed in the multi-touch screen user interface in near real-time, and
wherein the multiple layers of the multi-touch screen user interface include a geographical map layer, spatiotemporal data layer, a querying and aggregation layer, a user interface widget layer and a rendering layer.

14. The apparatus of claim 13, wherein the user inputs simultaneously alter plural dimensions of the four-dimensional geospatial air traffic data.

15. The apparatus of claim 14, wherein the user inputs specify one of defining a subset of flights for analysis, specifying an airline, specifying a departure airport, specifying an arrival airport, specifying a date interval, specifying a time interval, specifying a latitude, and specifying a longitude.

16. The apparatus of claim 13, wherein the multi-touch screen user interface includes at least one of graphical indications of the number of aircraft departures and arrivals at various time intervals, departure and arrival controls that adjust a range of departure and arrival times and dates, a time-based control that adjusts the time range of displayed aviation data, and a flight table that shows a flight information for each display flight.

* * * * *